Figure 1:
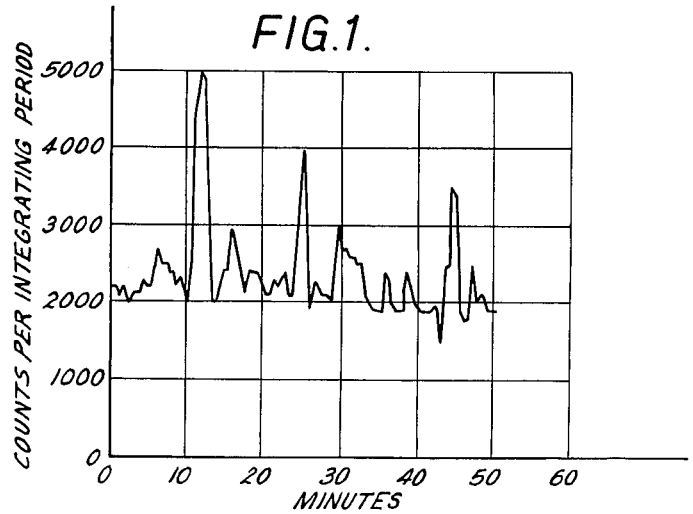

March 15, 1966    F. J. STUBBS ETAL    3,240,673
NUCLEAR REACTOR FUEL ELEMENT LEAK DETECTION
Filed Dec. 4, 1961    4 Sheets-Sheet 1

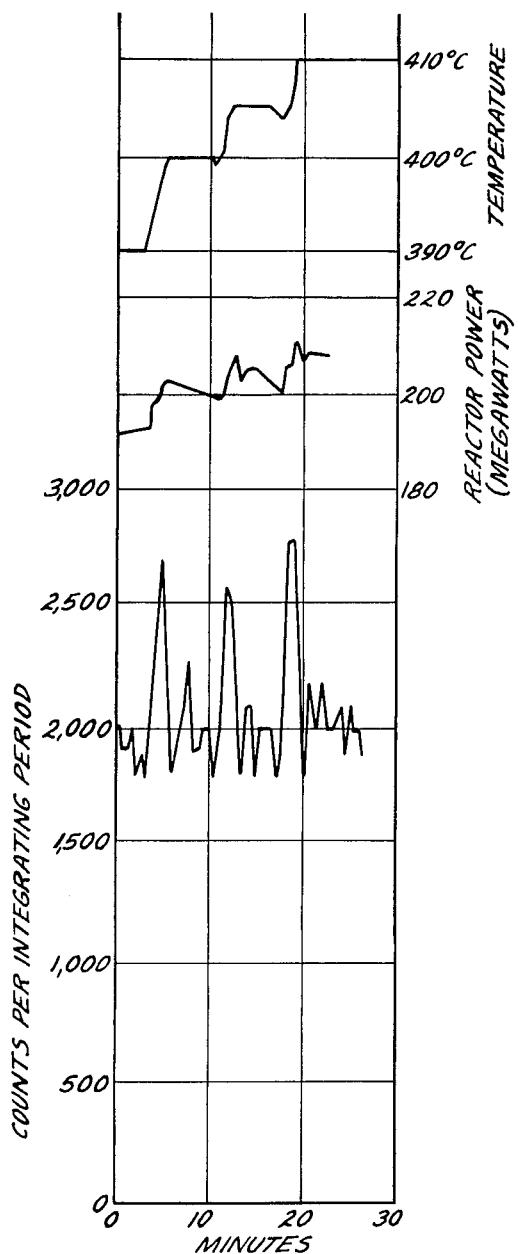

United States Patent Office 3,240,673
Patented Mar. 15, 1966

3,240,673
NUCLEAR REACTOR FUEL ELEMENT
LEAK DETECTION
Frederick John Stubbs, Oxford, and Gilbert Northcott Walton, Abingdon, England, assignors to United Kingdom Atomic Energy Authority, London, England
Filed Dec. 4, 1961, Ser. No. 156,814
Claims priority, application Great Britain, Dec. 9, 1960, 42,394/60
6 Claims. (Cl. 176—19)

This invention relates generally to a method of testing applicable to the control of gas cooled nuclear reactors of the kind in which the fuel elements thereof comprise nuclear fuel members each enclosed in a protective sheath.

In association with such a gas-cooled nuclear reactor it is usual to provide apparatus by which coolant gas passing through the reactor is monitored for the presence of fission products so that failure in the sheaths of fuel elements in the reactor (which leads to the release of fission products into the coolant) may be detected at an early stage in the development of a failure and gross radioactive contamination of the coolant and coolant circuit avoided. Such apparatus is referred to as fuel element leak detector apparatus and is exemplified by U.S. Patent No. 2,987,459 to J. Labeyrie et al.

According to the present invention a method of testing applicable to the control of a nuclear reactor, of the kind described and associated with fuel element leak detector apparatus for detecting fission products, comprises the step of rapidly raising the temperature of fuel elements in a coolant channel in the reactor while the reactor is operating at power, whereby a transient burst of fission products is emitted from any existing leaks in the fuel element sheaths into the coolant stream for detection by the detector apparatus.

One method of rapidly raising the temperature of fuel elements in a coolant channel is to reduce suddenly the rate of flow of coolant through that channel while the pressure of the coolant remains unaltered. Reduction of the rate of coolant flow will also increase the concentration of fission products in the coolant in that channel and this will enhance the response of the detector apparatus.

According to the present invention apparatus for use in the control of a nuclear reactor of the kind described comprises, in combination, fuel element leak detector apparatus and means for suddenly reducing the rate of flow of coolant through individual coolant channels, thereby rapidly raising the temperature of fuel elements in such channels.

Another method of rapidly raising the temperature of fuel elements in a coolant channel of the reactor is to raise the power output of the reactor (by normal control procedures), while maintaining constant the rate of flow of coolant through that channel and the coolant pressure.

Yet another method of achieving a rapid increase in temperature of fuel elements in a coolant channel in the reactor is by the act of restoring the temperature of the fuel elements in that channel to a value which they had immediately before a sudden *increase* in the rate of coolant flow through that channel. The act of restoring the temperature will normally be achieved by raising the power output of the reactor by normal control means.

It has been found that when the temperature of a fuel element in a reactor operating at power is raised rapidly from one temperature to a higher temperature, the rate of emission of gaseous fission products from the fuel material rises suddenly to a high value and then returns to a low value, dependent on the final temperature and only slightly higher than that which prevailed at the initial temperature. The value to which the rate of emission rises during this burst of emission depends on the rate of rise of temperature as well as on the initial and final temperatures. It has been found however that a sharp burst of short-lived fission product activity is obtained when the rate of rise of temperature is 4° C./min. or greater, the difference between the initial and final temperatures is at least 4° C. and the final temperature is at least 400° C.

The nature of the burst is also dependent on the period for which the fuel element has been maintained at the first temperature. Provided that the fuel element has been at the first temperature sufficiently long for an equilibrium emission rate of fission products to be established, a sharp burst of fission product emission will occur on raising the temperature rapidly.

If there is a leak in a fuel element sheath, a sharp burst of fission product activity occurs, in the coolant channel in which that fuel element is situated, or raising rapidly the temperature of the fuel elements in that channel. This burst will be detectable by the detector apparatus when the size of the leak is much smaller than that of a leak which is just detectable by the detector apparatus under equilibrium temperature conditions in the coolant channel.

The nature of the invention and the manner in which it is to be performed will be made more apparent if reference is made to the following Examples, and to the accompanying FIGURES 1 to 5, which are graphical representations of the way in which the fission product activity recorded by the fuel element leak detector apparatus varies during rapid increases in temperature of fuel elements, brought about in the manner to be described in the examples.

In each of the examples, the operations were carried out on one of the gas-cooled, graphite-moderated reactors at Chapel Cross in Scotland, the fuel elements of which consist of uranium metal enclosed in a protective sheath of magnesium alloy and are arranged in vertical channels in which they are cooled by a flow of carbon dioxide. Coolant from any individual channel can be passed through leak detector apparatus in which fission product activity is recorded continuously by measuring the total number of counts during successive integrating periods of the order of half a minute each.

*Example I*

In this example, the fuel element leak detector apparatus was arranged so as to record continuously the fission product activity in coolant leaving a fuel element channel which had recorded a higher mean level of activity than normal during routine checks suggesting that an incipent leak was present. After operation of the reactor at a power of 125 mw. for a period sufficient to establish equilibrium conditions, the power was increased slightly so as to raise the maximum recorded fuel element sheath temperature from 390° C. to 400° C. in about one minute. One minute later, the number of counts recorded had risen from the previous mean level of about 2300 above background to a level of 5000 above background. After a further two minutes the number of counts had fallen back to the original mean level. Ten minutes later the power was increased again to raise the temperature from 400° C. to 405° C. in about half a minute. One and a half minutes later the number of counts had risen to 4000 and after a further minute had fallen back to the original mean level. Fourteen minutes later, a further power increase which raised the temperature from 405° C. to about 410° C. in about half a minute caused a rise in the number of counts after one minute to 3500, falling to the original means level one minute later.

The complete record of the number of counts per integrating period is shown for Example I in FIGURE 1, starting six minutes before the first power increase. The graph shows clearly that each of the rapid temperature increases (about 10° C. per minute) resulted in a transient burst of activity shortly afterwards.

*Example II*

Figure 2:
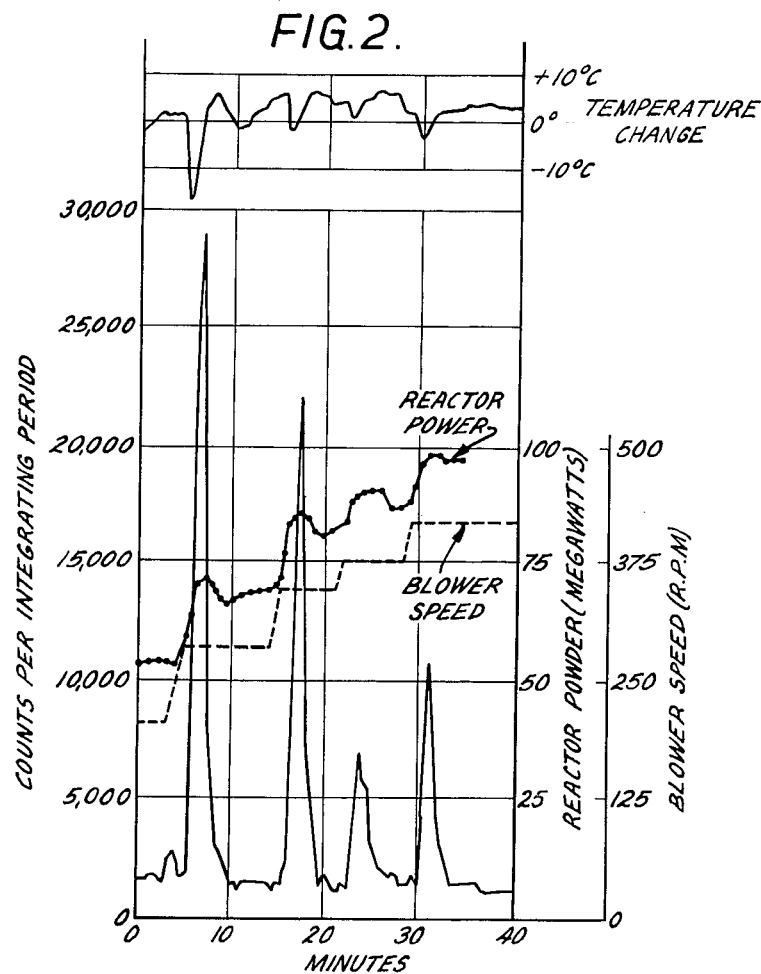

In this example, the fuel element leak detection apparatus was arranged so as to record continuosuly the fission product activity in coolant leaving a fuel element channel which was suspected of containing a fuel element having a leak which was likely to develop rapidly into a fast leak at a later date. After operation of the reactor at a power of about 50 mw. for a period sufficient to establish equilibrium conditions, the power was increased in a series of steps by increasing the speed of the coolant blowers, and then taking action to restore the maximum recorded fuel element sheath temperature to the same value, after each increase in blower speed, by adjusting the power level of the reactor. The changes in blower speed reactor power, fuel element sheath temperature in adjacent fuel element channels, and the number of counts per integrating period are shown in FIGURE 2.

From the graphs it can be deduced that rapid increases in temperature of the fuel elements, brought about by restoring the temperature after each increase in blower speed, caused sharp bursts of fission product activity shortly after each temperature increase. Figures from the detailed results on which the graphs were based are given in the following table:

| Change in blower speed (r.p.m.) | Temperature increase (° C.) | Maximum temperature increase in 1 min.(° C.) | Amplitude of signal peak |
|---|---|---|---|
| 205 to 290 | 21 | 16 | 26,200 |
| 290 to 350 | 8 | 6 | 20,500 |
| 350 to 375 | 4 | 4 | 5,800 |
| 375 to 425 | 5 | 5 | 9,500 |

Subsequent examination of fuel elements from this channel revealed a defect in the welded end-cap of one fuel element.

*Example III*

A similar procedure was carried out as in Example I, the leak detector apparatus being connected to a fuel element channels in which routine checks had suggested that an incipent leak was present. After equilibrium had been reached at a reactor power of 140 mw., the power was increased in two steps so as to raise the maximum recorded fuel element temperature rapidly from 390° C. to 400° C. and from 400° C. to 409° C., respectively.

Figure 3:
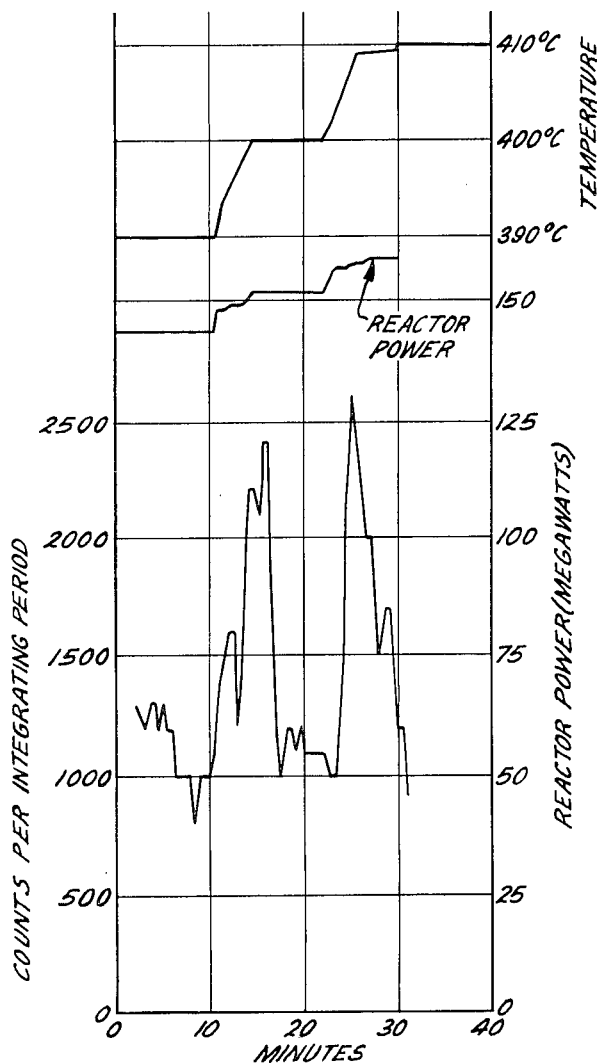

The changes in reactor power, fuel element sheath temperature and number of counts per integrating period are shown in FIGURE 3. The graphs show that each of the rapid temperature increases caused transient bursts of activity shortly afterwards.

*Example IV*

The fuel element leak detector apparatus was connected to a channel which had given erratic results on previous routine checks and was suspected of containing an incipient leak. By a similar procedure to that of Example I, the maximum recorded fuel element sheath temperature was raised slowly from 390° C. to 400° C. in 5 minutes (2°/min.), immediately after which no significant peaks in activity were recorded. The temperature was then raised rapidly to 405° C. in 1 min. The corrective action to prevent further increase of temperature resulted in a double peak in the temperature, and this resulted in a double peak also in the activity recorded. After a few minutes, the temperature was raised rapidly to 410° C. in 1 minute, with similar results.

Figure 4:
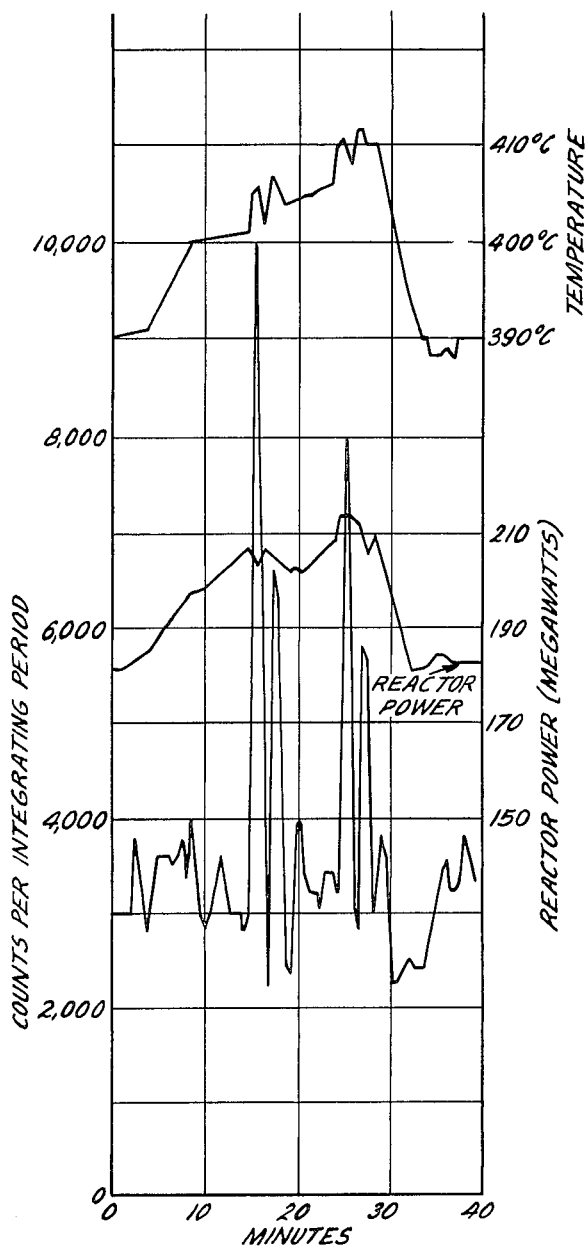

The changes in reactor power, fuel element sheath temperature and number of counts per integrating period are shown in FIGURE 4.

*Example V*

A similar procedure was carried out as in Example I, the leak detector apparatus being connected to a fuel element channel in which routine checks had suggested that an incipient leak was present. After equilibrium had been reached at a reactor power of 190 mw., the power was increased in three steps so as to raise the maximum recorded fuel element temperature rapidly from 390° C. to 400° C., 400° C. to 405° C., and 405° C. to 410° C., respectively.

The changes in reactor power, fuel element sheath temperature and counts per integrating period are shown in FIGURE 5. The graphs show that significant peaks in activity occurred shortly after each temperature increase.

We claim:

1. A method of operating a gas-cooled nuclear reactor of the kind in which the fuel elements thereof comprise nuclear fuel members each enclosed in a protective sheath and in which means are provided for monitoring the coolant gas passing through individual coolant channels in the reactors for the presence of fission products emitted from fuel elements in said channels, said method comprising the step of raising the temperature of fuel elements in a coolant channel in the reactor by at least 4° C. per minute to a final temperature of at least 400° C., whilst the reactor is operated at power, whereby a transient burst of fission products is emitted from any existing leaks in the fuel element sheaths into the coolant passing through said channel, and measuring the activity of the coolant gas from such channel.

2. The method of claim 1 wherein the temperature change is effected by reducing the rate of flow of coolant through the said coolant channel while the coolant pressure remains unaltered.

3. The method of claim 1 wherein the temperature change is effected by raising the power output of the reactor while the rate of flow of coolant and the coolant pressure remain unaltered.

4. The method of claim 1 wherein the temperature of the fuel elements is decreased by increasing the rate of flow of coolant through the said coolant channel and then the requisite temperature increase is effected by raising the power output of the reactor to restore the temperature of the fuel elements in the said channel to a value which they had immediately before the said increase in the rate of flow of coolant.

5. A method of detecting leaking fuel elements in a gas cooled nuclear reactor of the kind in which the fuel elements thereof comprise nuclear fuel members each enclosed in a protective sheath and in which means are provided for monitoring the coolant gas passing through individual coolant channels in the reactor for the presence of fission products emitted from fuel elements in said channels, said method comprising the step of raising the temperature of fuel elements in a coolant channel in the reactor by at least 4° C. at a rate of at least 4° C. per minute to a final temperature of at least 400° C. while the reactor is operating at power, whereby a transient burst of fission products is emitted from any existing leaks in the fuel element sheaths into the coolant passing through said channel, and measuring the activity of the coolant gas from such channel.

6. A method according to claim 5 wherein the temperature of the fuel elements in said coolant channel is raised by effectively raising the coolant gas temperature of the whole reactor.

References Cited by the Examiner

UNITED STATES PATENTS

| | | | |
|---|---|---|---|
| 1,613,962 | 1/1927 | Schworetzky | 73—45.5 |
| 2,987,459 | 6/1961 | Labeyrie | 176—19 |

FOREIGN PATENTS 915,339   1/1963   Great Britain.

OTHER REFERENCES

"Control of Tightness by Liquation of Helium," C. Level de Curnieu (Compagnie Francaise Thomson-Houston, Paris), pp. 197–212 of "VI Rassegna Internazionale Ellettronicae Nucleare. Atti Del Congresso Scientific, June 1959. Sezione Nucleare, vol. I," Rome, Comitato Nationale Richerche Nucleari (1959). (In French.) Cited in Nuclear Science Abstracts, vol. 14, p. 1223, May 31, 1960.

REUBEN EPSTEIN, *Primary Examiner.*

CARL D. QUARFORTH, *Examiner.*